(12) United States Patent
De Bast

(10) Patent No.: US 9,221,515 B2
(45) Date of Patent: Dec. 29, 2015

(54) BICYCLE PEDAL

(71) Applicant: TIME SPORT INTERNATIONAL, Vaulx-Milieu (FR)

(72) Inventor: Jean-Francois De Bast, Vaulx-Milieu (FR)

(73) Assignee: TIME SPORT INTERNATIONAL (FR)

( * ) Notice: Subject to any disclaimer, the term of this patent is extended or adjusted under 35 U.S.C. 154(b) by 7 days.

(21) Appl. No.: 13/946,654

(22) Filed: Jul. 19, 2013

(65) Prior Publication Data

US 2014/0020504 A1  Jan. 23, 2014

(30) Foreign Application Priority Data

Jul. 19, 2012 (FR) ..................................... 12 56971

(51) Int. Cl.
*B62M 3/00* (2006.01)
*B62M 3/08* (2006.01)

(52) U.S. Cl.
CPC .............. *B62M 3/086* (2013.01); *Y10T 74/217* (2015.01)

(58) Field of Classification Search
CPC ................................ B62M 3/08; B62M 3/086
USPC .............. 74/560, 594.1, 594.4–594.7; 36/131
IPC ....................................................... B62M 3/00
See application file for complete search history.

(56) References Cited

U.S. PATENT DOCUMENTS

| 1,393,256 | A | * | 10/1921 | Wright | .......................... 280/261 |
| 5,131,291 | A | * | 7/1992 | Beyl | ............................. 74/594.6 |
| 5,213,009 | A | * | 5/1993 | Bryne | .......................... 74/594.6 |
| 8,752,453 | B2 | * | 6/2014 | Plassiard et al. | ............. 74/594.6 |

FOREIGN PATENT DOCUMENTS

FR  2809701  12/2001

OTHER PUBLICATIONS

Machine translation of FR 2809701 obtained on Nov. 13, 2014.*

* cited by examiner

*Primary Examiner* — Adam D Rogers
(74) *Attorney, Agent, or Firm* — The Belles Group, P.C.

(57) ABSTRACT

Bicycle pedal with safety fixing comprising a pedal body (1) rotatably mounted on an axle (2) and, on one face of the pedal body, a mechanism (A) for attachment of a cleat adapted to be fixed to the bottom of a shoe, this mechanism comprising first attachment means (3) and second attachment means (4) situated on either side of the axle of the pedal, one of the attachment means consisting of a hoop (5) that is virtually fixed relative to the pedal body while the other attachment means (3) are mobile and can be moved against a return spring in a direction substantially orthogonal to the axle of the pedal to clamp the cleat or release it the hoop (5) has a lug (6*a*, 6*b*) at each of its two ends, each lug having passed through it and being supported by at least one spring axle (7*a*, 7*b*) mounted in the pedal body, which spring axle also supports is the mobile attachment means (3).

13 Claims, 2 Drawing Sheets

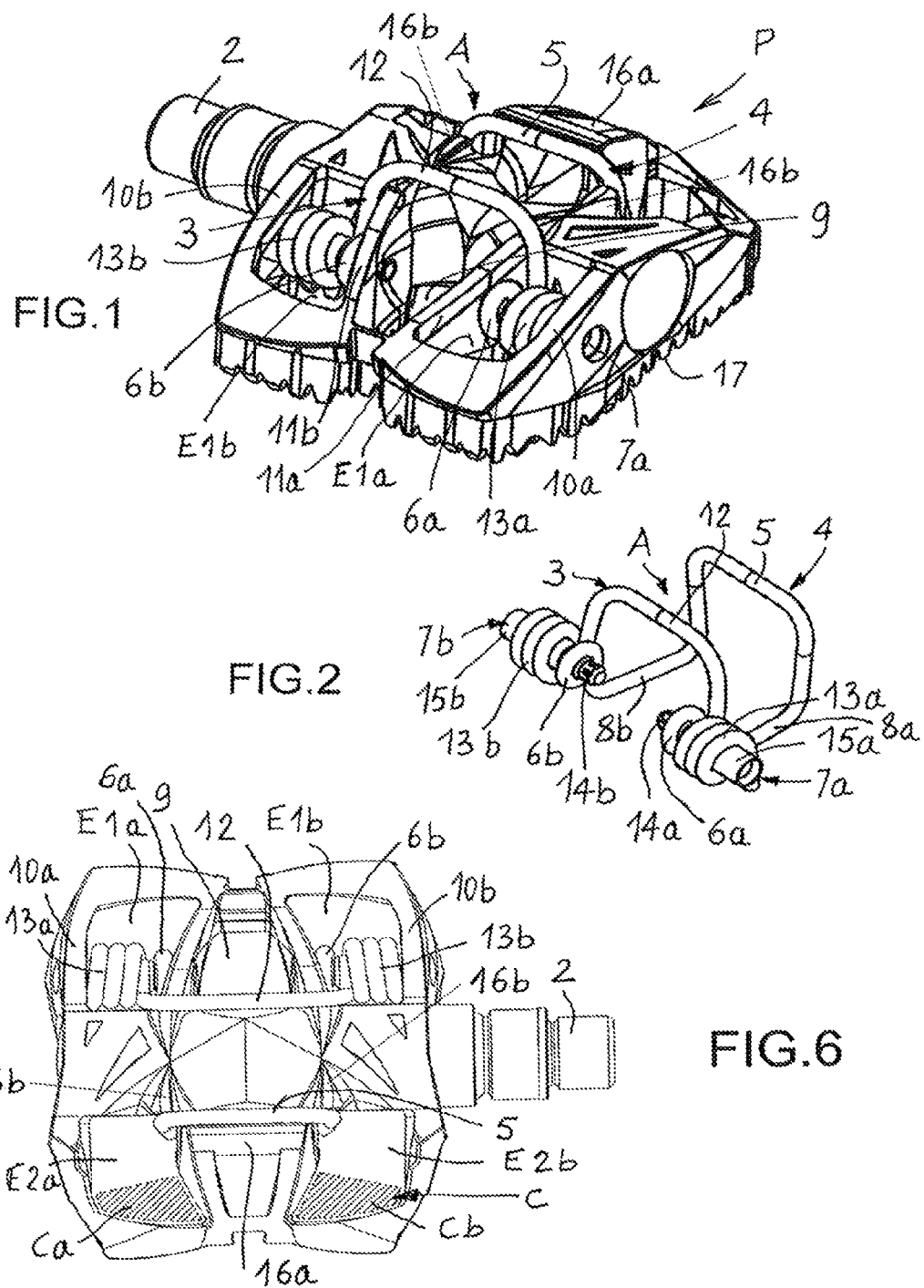

007# BICYCLE PEDAL

PRIORITY

Priority is claimed under 35 U.S.C. §119 to French Application No. FR 12 56971, filed Jul. 19, 2012. The disclosure of the aforementioned priority application is incorporated herein by reference in its entirety.

FIELD OF THE INVENTION

The present invention relates to a bicycle pedal with safety fixing, of the kind that comprises a pedal body rotatably mounted on an axle and, on one face of the pedal body, a mechanism for attachment of a cleat adapted to be fixed to the bottom of a shoe, this mechanism including first attachment means and second attachment means on either side of the axle of the pedal, one of the attachment means consisting of a hoop that is virtually fixed relative to the pedal body while the other attachment means are mobile and can be moved against a is return spring in a direction substantially orthogonal to the axle of the pedal to clamp the cleat or release it.

BACKGROUND

A pedal of this kind is known, notably from FR 2 80 701.
The aim of the invention is, above all, to propose a pedal of particularly economic and lightweight design, calving for a small number of parts, and which is easy to assemble.

SUMMARY OF THE INVENTION

In accordance with the invention, a bicycle pedal with safety fixing, of the kind in question, is characterized in that the hoop has a lug at each of its two ends, each lug having passed through it and being supported by at least one spring axle mounted in the pedal body, which spring axle also supports the mobile attachment means.

The virtually fixed hoop preferably consists of an inverted U-shaped part extended by two branches globally perpendicular to the plane of the U-shape, a lug being provided at each end of a branch remote from the plane of the U-shape. The parts of the branches of the hoop situated between the lugs and the U-shape may pass under the central area of the body that encloses the pedal axle.

The virtually fixed hoop may be produced in spring wire, in particular in stainless steel, and the lugs consist of loops. Another possibility is for the virtually fixed hoop to be produced in the form of a moulded part and for the lugs to consist of orifices.

The spring axle is advantageously formed of two elementary spring axles separated by a gap in the median area of the pedal and carried by walls of the pedal body delimiting a window in which the greater part of the spring, axle is situated.

The virtually fixed hoop may be disposed at the rear of the pedal while the other, mobile attachment means are disposed at the front. The opposite arrangement with the virtually fixed hoop at the front is nevertheless possible.

The mobile attachment means advantageously consist of a spring-hoop including at each of its ends return spring means, in particular in the form of a torsion spring through which passes and which is supported by the spring axle. The spring-hoop is in particular produced in spring wire and includes at each of its ends a coiled portion forming a torsion spring.

The pedal may include a removable counterweight globally fixed at the level of windows of the body that are opposite the springs and the spring axles relative to the pedal axle, so as to invert the natural tendency of the pedal to drop in favour of the other bearing face.

Each spring axle may include a smaller diameter part situated on the inside over which is engaged an associated lug of the fixed hoop and a larger diameter part situated on the outside carrying the spring-hoop.

The pedal includes stops provided on the pedal body adapted to cooperate with the fixed hoop so that all degrees of freedom of this hoop relative to the pedal body are immobilized.

BRIEF DESCRIPTION OF THE DRAWINGS

Apart from the features disclosed above, the invention consists in a certain number of other features referred to more explicitly hereinafter with reference to an embodiment which is described with reference to the appended drawings but which is in no way limiting on the invention. In the drawings:

FIG. 1 is a perspective view of a left-hand bicycle pedal in accordance with the invention with the face provided with the attachment means facing upward.

FIG. 2 is a perspective view of the attachment means alone and the spring axles.

FIG. 6 shows the pedal in plan view as seen from the rear of the bicycle and when it is optionally provided with a counterweight C that can be produced in one piece or in two parts Ca and Cb.

DETAILED DESCRIPTION

Figure 3:
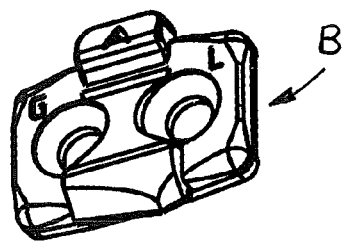
FIG. 3 is a perspective view of the attachment cleat with its bottom face facing upward.

Referring to the drawings, notably to FIG. 1, there can be seen a bicycle pedal P with safety fixing comprising a pedal body 1 mounted rotatably on an axle 2 and, on one face of the pedal body, an attachment mechanism A for a cleat B (FIG. 3) adapted to be fixed to the bottom of a shoe. The pedal body 1 may be made of a plastic material or a light alloy casting. The mechanism A comprises first attachment means 3 in front of the axle 2 and second attachment means 4 behind the axle. The terms "in front" and "behind" are to be understood as relating to the normal direction of movement of the bicycle, with the face of the pedal provided with the attachment mechanism facing upward.

The second attachment means 4 consist of a hoop 5 that is virtually fixed relative to the pedal body 1 while the first attachment means 3 are mobile and can be moved against a return spring in a direction substantially orthogonal to the axle 2 of the pedal to clamp the cleat B or release it.

The hoop 5 has a lug 6a, 6b (FIG. 2) at each of its two ends, each lug having passing through it and being supported by at least one spring axle 7a, 7b mounted in the pedal body, which spring axle also supports the first attachment means 3.

Figure 5:
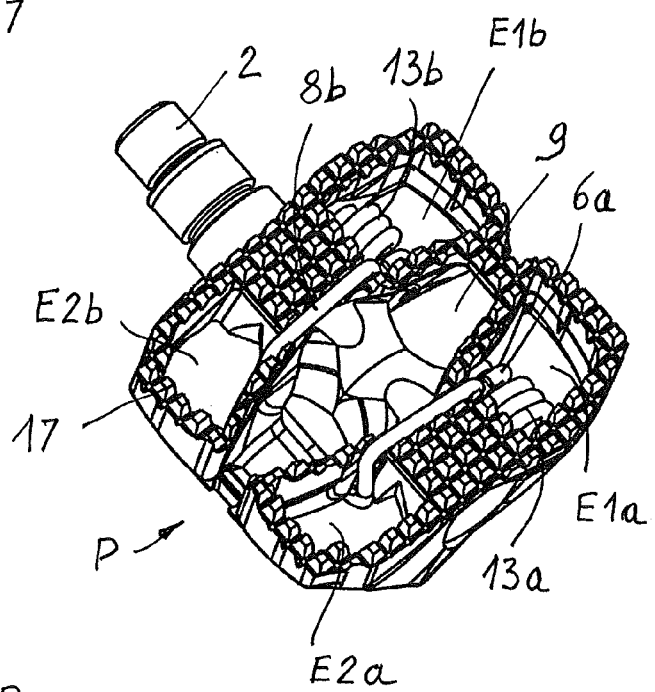
FIG. 5 shows the pedal in perspective, in a similar way to FIG. 4, the attachment means having been installed.

The hoop 5 preferably consists of an inverted U-shaped part extended by two branches 8a, 8b globally perpendicular to the plane of the U-shape. The lug 6a, 6b is provided at each end with a branch 8a, 8b remote from the plane of the U-shape. In the position of the pedal shown in FIG. 1, the parts of the branches 8a, 8b of the hoop situated between the lugs and the U-shape pass under the central area of the body 1 that encloses the pedal axle 2; in the inverted position shown in FIG. 5, these parts of the branches 8a, 8b pass over said central area of the body 1.

The hoop 5 may be produced in spring wire, in particular stainless steel spring wire, and the lugs 6a, 6b then consist of loops. Another possibility is for the hoop 5 to be produced in the form of a moulded part and the lugs to consist of orifices.

The spring axle is advantageously formed of two elementary spring axles 7a, 7b separated by a gap 9 in the median area of the pedal and supported in orifices in walls 10a, 11a, 10b, 11b of the pedal body. These walls delimit a plurality of windows, namely two windows E1a, E2a and E1b, E2b on each side of the to pedal, on respective opposite sides of the pedal axle 2. The greater part of each elementary spring axle 7a, 7b is situated in one of these windows E1a, E1b, respectively, Alternatively, the spring axle could be in one piece, of constant diameter, extending from one edge to the other of the pedal.

The fixed hoop 5 is generally, although not exclusively, disposed at the rear of the pedal, while the other, first attachment means 3 are disposed at the front. The opposite arrangement with the fixed hoop at the front is nevertheless possible.

The first attachment means 3 advantageously consist of a spring-hoop 12 including at each of its ends return spring means, in particular in the form of a torsion spring 13a, 13b through which passes and which is supported by the associated elementary spring axle. The spring-hoop is advantageously produced in spring wire and includes at each of its ends a coiled portion forming the torsion spring 13a, 13b.

Each spring axle 7a, 7b includes a smaller diameter part 14a, 14b (FIG. 2) situated on the inside over which is engaged the associated lug 6a, 6b of the hoop and a larger diameter part 15a, 15b situated on the outside carrying the spring-hoop 12.

The pedal includes stops 16a, 16b, notably a rear stop 16a forming a boss, arranged on the pedal body so as to cooperate with the hoop 5 in order for all degrees of freedom of this hoop relative to the pedal body to be immobilized.

Crampons 17 (FIGS. 4 and 5) are present on the face of the pedal opposite the hoops 5 and 12 in order to offer a concave bearing platform adapted to retain a traditional shoe sole or even a sole equipped with an attachment cleat.

Moreover, the pedal features large apertured areas forming the windows E1a, . . . E2b (FIGS. 4 and 5) adapted to evacuate mud during ATB use and offering a very "open" aesthetic.

The various component parts of the pedal are assembled easily and quickly.

Figure 4:
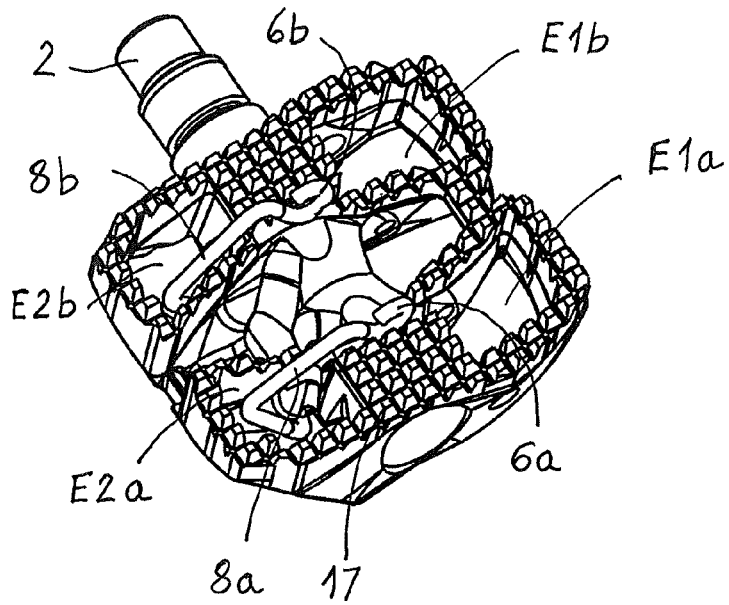
FIG. 4 is a perspective view of the pedal from FIG. 1 after turning one half-turn about its axle, the attachment means being in the process of being installed.

The mounting of the fixed hoop 5, shown in FIG. 4, exploits the presence of the openings E. By a globally rotary movement, the lugs 6a, 6b at the ends of the branches 8a, 8b are passed through the appropriate windows E of the body until the horizontal transverse bar of the U-shape is near the boss 16. Then by rotation of the fixed hoop 5 about the geometrical axis of this bar, the branches 8a. 8b come to enclose the central part of the body. At the end of the rotary movement, the loops 6a, 6b face orifices in the walls or arms of the body 1 adapted to receive the elementary spring axles 7a, 7b.

The mobile hoop 12 is then positioned with its coiled portions 13a, 13b on either side of the lugs 6a, 6b. The elementary spring axles 7a, 7b are then engaged in the orifices in the walls of the pedal body, the coiled portions 13a, 13b and the 2o lugs 6a, 6b. The elementary spring axles 7a, 7b are locked into the body 1, notably by virtue of a tight fit.

The attachment mechanism in accordance with the invention is of particularly economic and lightweight design. Assembly is easy.

The windows E2a, E2b situated on either side of the U-shaped part of the hoop 5 enable this area of the pedal to be very open, especially as they do not have any spring axle and consequently any lug 6a or 6b passing through them If the cleat B is not engaged in the mechanism A, the pedal tends to turn about the axle 2 in such a way that the weight of the coiled portions 13a and 13b plus the weight of the spring axles 7a and 7b causes these parts to move downward under their own weight.

In the case where the design of the pedal positions the spring-hoop 12 in front of the axle on the face equipped with the attachment mechanism A, it is the face not equipped with any attachment mechanism that is offered up first to the sole of the shoe of the user.

However, if the cyclist prefers the other face to be offered up by default, the pedal can be fitted with a removable counterweight C that can be produced in two parts Ca, Cb (FIG. 6) which are advantageously placed in the windows E2a, E2b situated on either side of the U-shaped part of the hoop 5.

This optional removable counterweight Ca, Cb, preferably consisting of a dense material, is fixed by screwing, clipping or by any other fixing means that the cyclist can use easily.

The invention claimed is:

1. A bicycle pedal comprising a pedal body mounted rotatably on a pedal axle and a mechanism configured to attach a cleat on a first bearing face of the pedal body, the cleat adapted to be fixed to the bottom of a shoe, the mechanism comprising first attachment means and second attachment means situated on either side of the axle of the pedal, the first and second attachment means configured to engage the cleat on a first lateral side of the pedal axle and on a second lateral side of the pedal axle, respectively, to hold the cleat on the first bearing face of the pedal body, the second attachment means including a hoop that is set in a fixed position relative to the pedal body while the first attachment means is movable relative to the pedal body and can be moved against one or more return springs in a direction substantially orthogonal to the axle of the pedal to clamp the cleat or release it, wherein the hoop has a lug at each of its two ends, each lug having passed through it and being supported by at least one spring axle mounted in the pedal body on one of the first lateral side or the second lateral side of the pedal axle, the at least one spring axle also supporting the first attachment means.

2. The pedal according to claim 1, wherein the hoop includes an inverted U-shaped part defining a plane and two branches extending perpendicular from the plane, one of the lugs being provided at an end of each branch remote from the plane of the U-shaped part.

3. The pedal according to claim 2, wherein part of each branch situated between the lugs and the U-shaped part passes under a central area of the pedal body that encloses the pedal axle.

4. The pedal according to claim 1, wherein the hoop is produced in spring wire, and the lugs comprise loops.

5. The pedal according to claim 4, wherein the spring wire is formed from stainless steel.

6. The pedal according to claim 1, wherein the hoop is a moulded part and the lugs comprise orifices.

7. The pedal according to claim 1, wherein the at least one spring axle is formed of two axle parts separated by a gap in a median area of the pedal, each axle part being supported by walls of the pedal body, the walls delimiting a plurality of windows, each axle part being situated in one of the windows.

8. The pedal according to claim 7, wherein each axle part includes a first diameter section and a second diameter section, with the first diameter section being smaller than the second diameter section, and wherein:

the first diameter section being situated toward an inside of the pedal body and having each of the lugs of the hoop engaged around it, and the second diameter section being situated toward an outside of the pedal body and supporting the first attachment means.

9. The pedal according to claim 1, wherein the hoop is disposed at the rear of the pedal while the first attachment means is disposed at the front.

10. The pedal according to claim 1, wherein the first attachment means comprise a spring-hoop including at each of its ends one of the one or more return springs.

11. The pedal according to claim 10, further including a removable counterweight fixed on windows of the pedal body that are located opposite to the one or more return springs and the at least one spring axle relative to the pedal axle, so as to invert the natural tendency of the pedal to drop in favour of a second bearing face of the pedal body.

12. The pedal according to claim 10, wherein the spring-hoop is made of spring wire and the return springs are torsion springs formed by a coiled portion of the spring wire, the at least one spring axle passing through the torsion springs to support the spring-hoop.

13. The pedal according to claim 1, further comprising stops provided on the pedal body adapted to cooperate with the hoop so that all degrees of freedom of the hoop relative to the pedal body are immobilized.

\* \* \* \* \*